United States Patent Office.

WILLIAM S. THOMAS, OF CARBON CLIFF, ILLINOIS.

Letters Patent No. 96,634, dated November 9, 1869.

IMPROVED ENAMEL OR GLAZE FOR POTTERY, BRICK, TILES, &c.

The Schedule referred to in these Letters Patent and making part of the same.

*To all whom it may concern:*

Be it known that I, WILLIAM S. THOMAS, of Carbon Cliff, in the county of Rock Island, and State of Illinois, have invented a new and improved Enamel or Glaze; and I do hereby declare that the following is a full, clear, and exact description, which will enable others skilled in the art to make and use the same.

My invention consists in an improved enamel for pottery-ware, metals, brick, and other substances, composed of the ingredients and made in substantially the manner hereinafter described.

To make an enamel particularly good for enamelling brick and terra-cotta for building-purposes, I use the following ingredients:

Cryolite, one part.
Felspar, one part.
Flint, one part.
Kaoline, half part.
Oxide of zinc, half part.

These ingredients should be mixed and ground to an impalpable powder, with water, in any suitable manner, say in a pottery-glaze mill; and I prefer to have the mixture of about the consistency of cream. When it is to be used, it can be applied to the surface or article to be enamelled by a brush or by dipping the article into the mixture. After being properly applied, the articles enamelled can be fired in a kiln of the same kind or similar to those ordinarily used by potters.

For a finer quality of enamel, suitable for crockery-ware known as "C C ware," I first make the following fritt:

I take, of cryolite, one part; of flint, two parts; of oxide of lead, one-half part; and these are fritted in a kiln.

I then make an enamel of the following ingredients:

Fritt, six parts.
Felspar, one part.
Kaoline, one part.
Enamel-sand, half part.
Oxide of lead, two parts.

These ingredients should be ground and mixed in any suitable way, say in a pottery-glaze mill, as before alluded to; and the enamel may be used in the same manner as other enamel or glaze for pottery-ware.

I will here remark, that the proportions above given may be varied, and a harder or softer enamel be produced, that is, one which will require more or less heat or fire to make it run, and which will be more or less opaque; and I have found in my experiments that there are other minerals or earths which can be substituted for those named, and produce a very good enamel.

By properly compounding the ingredients hereinabove specified, and varying the proportions, I produce an opaque enamel of great beauty and durability, and susceptible of receiving colors from different metallic oxides.

What I claim as my invention, and desire to secure by Letters Patent, is—

1. An enamel, or glaze composed of cryolite, felspar, flint, and kaoline, made substantially as herein specified.

2. An enamel composed of cryolite, flint, oxide of lead, felspar, kaoline, and enamel-sand, made substantially as herein specified.

WILLIAM S. THOMAS.

Witnesses:
S. S. THOMAS,
C. T. THOMAS.